No. 751,772. PATENTED FEB. 9, 1904.
C. B. ASKEW.
STORAGE BATTERY PLATE.
APPLICATION FILED MAY 20, 1903.
NO MODEL.
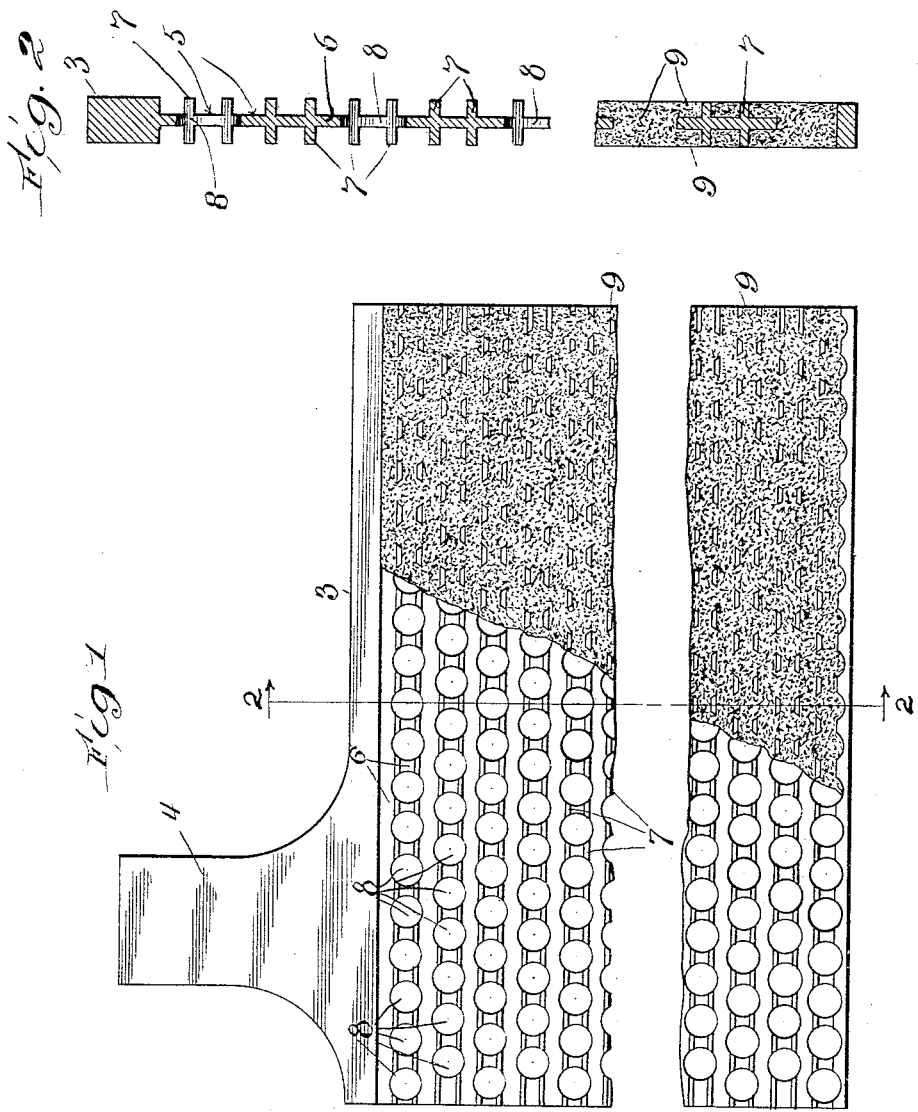
Witnesses:
Harry C. White
Ray White.
Inventor
Charles B. Askew
By Poné Bain Atty.

No. 751,772. Patented February 9, 1904.

UNITED STATES PATENT OFFICE.

CHARLES B. ASKEW, OF CHICAGO, ILLINOIS.

STORAGE-BATTERY PLATE.

SPECIFICATION forming part of Letters Patent No. 751,772, dated February 9, 1904.

Application filed May 20, 1903. Serial No. 157,972. (No model.)

*To all whom it may concern:*

Be it known that I, CHARLES B. ASKEW, of Chicago, in the county of Cook and State of Illinois, have invented certain new and useful Improvements in Storage-Battery Plates; and I hereby declare that the following is a full, clear, and exact description thereof, reference being had to the accompanying drawings, which form part of this specification.

My invention relates to plates for storage batteries.

The primary object of my invention is to provide a battery-plate which will be simple in construction and efficient in operation and which will obviate some of the difficulties inherent in the employment of battery-plates constructed by the usual methods in accordance with known designs.

More specifically, it is contemplated by my invention to provide a storage-battery plate so constituted and constructed that when pasted or filled with active material and in use the plate structure proper or grid will not be deleteriously affected by the expansion and contraction of the active material which attends the charging and discharging of the plate and that the said active material is prevented from "sloughing" off or breaking away from the supporting-body structure or grid.

A further object of my invention is to provide a battery-plate so constructed that the surface area of the active material exposed to the action of the electrolyte will be maximized and the surface area of the unpasted portions of the body member exposed to the electrolyte will be minimized.

It is with a view to accomplishing these and further objects, which will become apparent to those skilled in the art from the following description, that my invention is primarily designed.

Single-piece storage-battery plates are now commonly made by casting, the material employed being an alloy of lead with a small percentage of antimony. Pure lead cannot well be employed for plate-casting purposes, as it does not flow into the sharply-defined angular outlines required in a practical plate or grid formation. The addition of the small percentage of antimony imparts to the lead the quality of ready flow; but the cast product is exceedingly brittle, so that difficulty is experienced in handling the plates both in their manufacture and commercial use. The unadulterated lead, on the other hand, as is well known, is tough and may be bent and manipulated without fracture. It is advantageous therefore to employ commercially-pure lead in the formation of storage-battery plates or grids rather than antimonial alloy. Again, in casting plates it is essential in order that the cast product may be removed from its mold to taper all projections outwardly, and consequently all ribs or other projections formed upon the plates for the purpose of holding the active material must be tapered from their inner to their outer edges, presenting outwardly-inclined faces to support the active material. The active material supported upon such inclined lugs or projections therefore when expanded by the charging operation acts upon the divergent walls of the lugs above and beneath and tends to force its way bodily out of the recesses provided therefor in the plate-surface. When the active material on opposite sides of the plate is keyed through openings in the plate in the endeavor to afford lateral support to said active material, these keys tend to become split, leaving the material on opposite sides of the plate disconnected, and consequently, such material being without effective lateral support, it tends to slough off, particularly when the battery is subject to frequent jarring, as when employed for motor-vehicle purposes or the like.

My invention therefore contemplates the production of a plate provided with material retaining and supporting projections the upper and lower faces of which are disposed at right angles to the mean plane of a plate body or grid and also provided with key-apertures extending entirely through the grid, so that when pasted on both sides the active material upon opposite sides of the plate will be keyed together to afford lateral support thereto.

In the drawings, Figure 1 is a broken view of a battery-plate, a portion thereof being indicated as pasted or filled. Fig. 2 is an enlarged section taken on line 2 2 of Fig. 1.

Referring now to the drawings, 3 indicates generally the plate-body structure, provided with the usual integral terminal piece 4. This plate may be and is preferably made of commercially-pure lead rolled into a sheet of the desired thickness. The lead sheet when properly shaped is sawed transversely, preferably horizontally, to form a series of grooves 5 of suitable width and depth, such grooves being made in both sides of the plate, preferably in registering alinement, as illustrated in Fig. 2, and leaving therebetween a relatively thin supporting-web 6. During this sawing operation the saw-blades are disposed at right angles to the median plane of the rolled plate and the kerfs or grooves made therein at suitable distances apart, so as to leave between adjacent grooves 5 ribs or projections 7 of such width as may be found desirable, each of such ribs or projections having its upper and lower surfaces at right angles to the median plane of the grid, as best illustrated in Fig. 2.

8 8 indicate apertures of suitable size made through the grid, as by punching from side to side thereof. These apertures are preferably round in their configuration and of a diameter somewhat in excess of the width of a groove or kerf 5. They may be arranged in any suitable manner relative to each other and to the kerfs or grooves 5; but I prefer that a series of such apertures (as many as can conveniently be made therein without too greatly weakening the plate structure) be arranged in parallelism with every alternate kerf, the line of the centers of a series of such apertures coinciding with the median line of the kerf, so that the apertures extend through the ribs 7 on opposite sides of the groove 5. Thus the ribs 7 are all separated into series of short projections, each extending at its opposite ends to the edges of adjacent apertures 8. I have also found it advisable to arrange the successive transverse lines of apertures 8 in offset or staggered relation in order to evenly distribute the strength of the plate and offset the projections 7, intercepted by said apertures, leaving no portion of the filling material vertically unsupported for any considerable distance.

In the drawings I have illustrated the plate as being partially filled with active material, the filling material being indicated by the numeral 9. As can best be seen at the bottom of Fig. 2, the active material completely fills the groove 5 on opposite sides of the plate and the apertures 8. It will be seen now that the projections 7 vertically support the active material, which is prevented from lateral displacement by the cohesion of its particles, keyed from opposite sides through the apertures 8.

The advantages incident to the construction described have been in a measure pointed out. The formation of the grooves and projections by sawing a rolled plate rather than casting molten material enables the supporting lugs or projections to be formed with their transverse exposed surfaces arranged at right angles to the median plane of the plate, so that when the grid is filled with active material such material is at all points supported between straight parallel horizontal shoulders rather than between inclined surfaces. It follows, therefore, that during the expansion and contraction of the active material such material will have no tendency to bodily force itself outward, as it does when supported upon inclined surfaces, and thus relieving the material in the apertures keying the active material on opposite sides together of the lateral strain tending to break it and destroy the integrity of the mass of supported material.

It will be noted that the relative arrangement of the apertures and ribs or projections is such that the surface area presented by said projections to the exterior of the plate when filled is very small and that the arrangement is such as to insure proper support to the active material. It will further be noted that the toughness and flexibility of the lead in its unalloyed condition renders the plate easy to handle in manufacture and commercial use and obviates the liability to fracture always present in cast plates or grids.

Having thus described my invention, what I claim, and desire to secure by Letters Patent of the United States, is—

1. A storage-battery grid comprising a central web, having perforations made therethrough, and straight ribs formed upon said web, each of said ribs having its upper and lower surfaces disposed at right angles to the median plane of the web.

2. A storage-battery grid comprising a central web having perforations made therethrough, and parallel ribs projecting from said web, each of said ribs having its upper and lower surfaces disposed at right angles to the median plane of the web.

3. A storage-battery grid comprising a central web, having perforations made therethrough in alining series, and projections formed on opposite sides of said web in parallel arrangement alining with the aperture series, in such relation thereto that each projection terminates at its opposite ends at such apertures, each of said projections having its upper and lower surfaces disposed at right angles to the median plane of the web.

4. As an article of manufacture a storage-battery grid made of commercially-pure sheet-lead, transversely sawed from opposite sides in planes at right angles to the median plane of the sheet, to form on each side of the sheet, grooves separated by projections each having its upper and lower surfaces at right angles to the median plane of the grid, and said grid being punched through from side to side to form the apertures therethrough.

In testimony that I claim the foregoing as my own I affix my signature in presence of two witnesses.

CHARLES B. ASKEW.

In presence of—
MARY F. ALLEN,
GEO. T. MAY, Jr.